United States Patent
Eckel et al.

(10) Patent No.: US 7,039,549 B2
(45) Date of Patent: May 2, 2006

(54) SENSOR SYSTEM AND METHOD, IN PARTICULAR FOR DETERMINING DISTANCES

(75) Inventors: Matthias Eckel, Freiberg (DE); Juergen Hoetzel, Florstadt (DE)

(73) Assignee: Robert Bosch GmbH, Stuttgart (DE)

( * ) Notice: Subject to any disclaimer, the term of this patent is extended or adjusted under 35 U.S.C. 154(b) by 319 days.

(21) Appl. No.: 10/362,393

(22) PCT Filed: Aug. 21, 2001

(86) PCT No.: PCT/DE01/03105

§ 371 (c)(1),
(2), (4) Date: Aug. 8, 2003

(87) PCT Pub. No.: WO02/16958

PCT Pub. Date: Feb. 28, 2002

(65) Prior Publication Data

US 2004/0102919 A1 May 27, 2004

(30) Foreign Application Priority Data

Aug. 22, 2000 (DE) ................. 100 41 094

(51) Int. Cl.
*G01S 15/08* (2006.01)
*G01C 3/00* (2006.01)

(52) U.S. Cl. ........................ 702/158; 367/99
(58) Field of Classification Search ................. 702/97; 700/299

See application file for complete search history.

(56) References Cited

U.S. PATENT DOCUMENTS

| 4,416,153 A | * | 11/1983 | Williams ....................... 73/295 |
| 4,518,253 A | * | 5/1985 | Takahashi ................... 356/4.07 |
| 4,608,674 A | | 8/1986 | Guscott |
| 5,131,271 A | | 7/1992 | Haynes et al. |
| 5,517,196 A | * | 5/1996 | Pakett et al. ................... 342/70 |
| 5,631,875 A | * | 5/1997 | Romes et al. ................. 367/99 |
| 5,973,996 A | | 10/1999 | Zhevelev et al. ............. 367/99 |

* cited by examiner

*Primary Examiner*—David M. Gray
*Assistant Examiner*—Jonathan Moffat
(74) *Attorney, Agent, or Firm*—Kenyon & Kenyon

(57) ABSTRACT

A sensor system for determining distances is provided. A predefining unit controls an amplifier unit and/or a sensor unit as a function of selectable predefined values for a detection cycle. Contrary to known sensor systems, different detection cycles are implementable in a simple manner using this procedure.

7 Claims, 2 Drawing Sheets

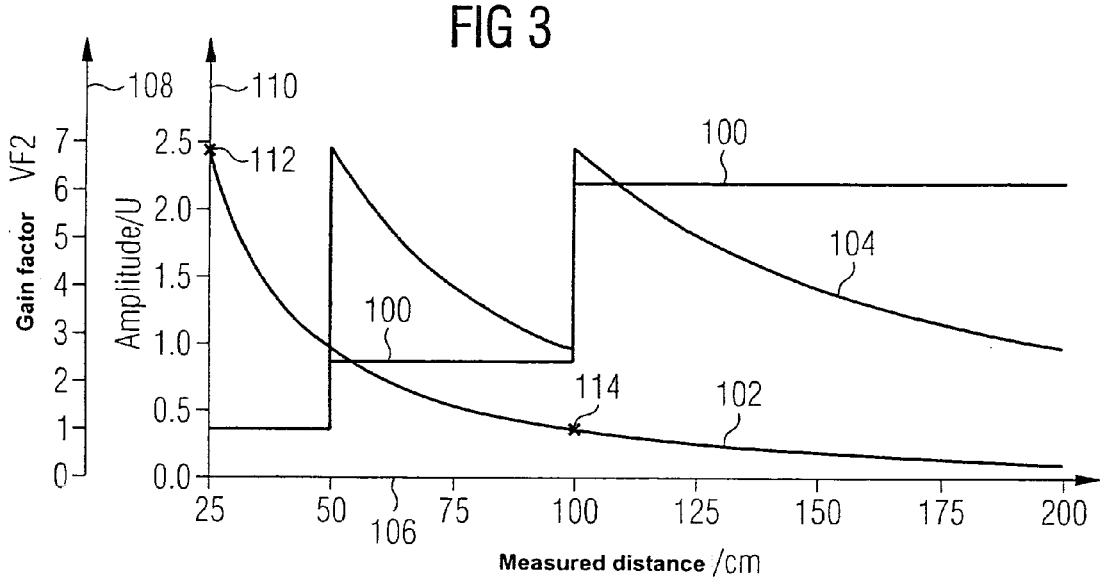
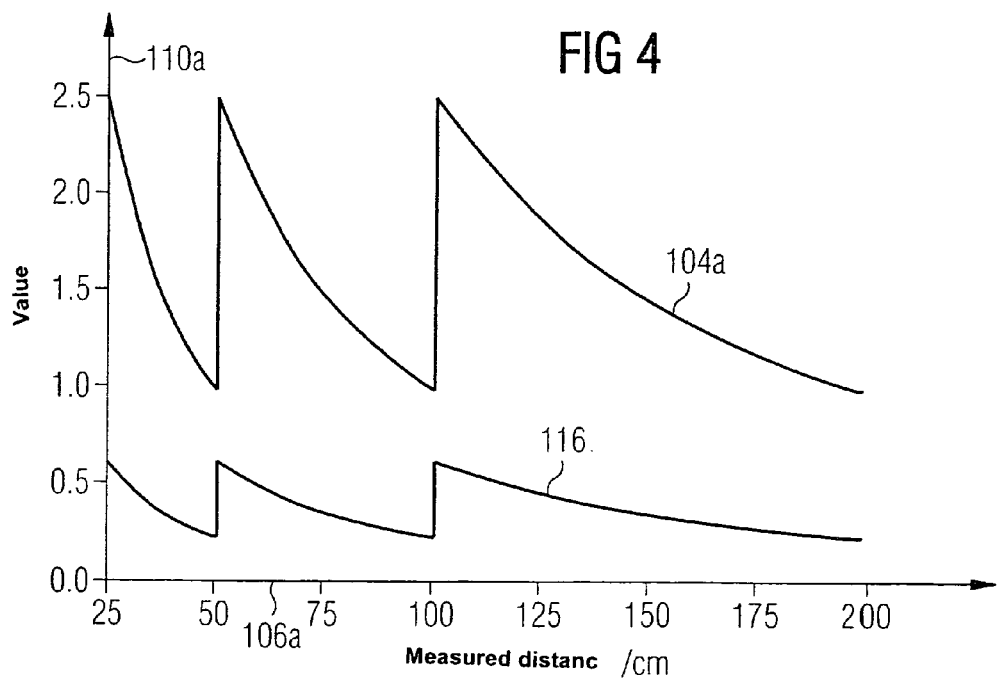

SENSOR SYSTEM AND METHOD, IN PARTICULAR FOR DETERMINING DISTANCES

FIELD OF THE INVENTION

The present invention relates to a sensor system, in particular for determining distances, which contains a sensor unit, an amplifier unit, and a predefining unit. The sensor unit operates in different detection areas during a detection cycle. At least one sensor signal is generated, as a function of the detection area, whose signal values are affected by an object located in the detection area. The amplifier unit is controllable and amplifies the sensor signal as a function of the value of a gain parameter. The predefining unit is used for predefining different values for the gain parameter during a detection cycle.

BACKGROUND INFORMATION

Known sensor units operate according to the pulse echo principle, in which the duration of a pulse in a pulse train determines the periods of time in which ultrasound waves or microwaves are emitted into the detection area of the sensor. An object reflects the waves as an echo to the sensor. The signals received by the sensor are analyzed to determine whether an object that exceeds a certain size is located in a certain detection area. Measuring cells, for example, which subdivide a close range, for example, a range from 0 meters to 7 meters using a grid spacing of 3 cm, form detection areas.

In pulse echo sensors, the relationship between energy E reflected by the obstacle and distance d of the sensor unit to the object reflecting the waves is not linear. The following approximate relationship applies:

$$E = 1/d^x \qquad (1)$$

where x is an exponent dependent on the design of the sensor unit.

FIG. 1 shows a schematic diagram of a known circuit 10 for specifying the values of a gain factor VF1 of an amplifier 12. Amplifier 12 is a controllable analog amplifier, e.g., of the type CA3080. A sensor signal on an input line 14 is amplified as a function of gain factor VF1. An amplified sensor signal is output to an output line 16, to which the output of amplifier 12 is connected. Output line 16 is connected to an analyzer circuit (not shown).

Gain factor VF1 is determined by the current at a control input of the amplifier. The control input is connected to a control line 18, which is connected to a tap 20 of a voltage divider, having resistors R1 and R2, located between ground and positive operating voltage VCC. A capacitor C is connected in parallel with resistor R2. Resistors R1, R2 and capacitor C form an RC element 22.

In the known sensor unit, 256 measuring cells spaced at 3 cm, for example, are measured during a detection cycle. For example, 300 wave packets are emitted within a measuring cell. The signals generated by the reflected waves are added up in the sensor unit. The processing of a measuring cell is completed after approximately 50 µs. The time of one detection cycle for all measuring cells is approximately 10 ms.

In the known sensor, the sequence of the detection areas and their duration is fixedly predefined by the design of a sensor unit. The values of gain factor VF1 are adjusted to the measuring ranges and thus also fixedly predefined. The gain factor of amplifier 12 is set by RC element 22. The application of a voltage to RC element 22 is synchronized with the beginning of a detection cycle. During the detection cycle, the voltage across RC element 22 increases exponentially as the distance of the detection area to the sensor unit increases. Due to this measure, the same object generates approximately the same output voltage across the amplifier in all detection areas. This simplifies further processing of the sensor signal.

SUMMARY OF THE INVENTION

An object of the present invention is therefore to provide a simplified sensor system and a simplified method that is usable, in particular for distance determination.

The present invention is based on the principle that a fixed relationship between the gain factor and the processed detection area is observed for optimum detection. This relationship, however, does not necessarily have to result in a rigid definition of the gain parameter values or of the selection of the detection areas.

In the sensor system according to the present invention, a control unit is used which triggers the amplifier unit and/or the predefining unit automatically differently using different predefined values for different detection cycles as a function of selectable predefined values for a detection cycle. Due to this measure, it is possible to continue to take into account the relationship between the detection area and the gain factor. In addition, it is possible to take into account predefined values and conditions which require a different relationship between gain factor and detection areas or another use of this relationship, e.g., in the case of a limited measuring range. Such a condition is, for example, the temperature at which the sensor system operates.

The predefined values may be established as a function of the situation. For example, for a small amplitude of the sensor signal in a certain detection area, the value of the gain parameter and thus the gain may be increased. As an alternative, for example, a plurality of measurements may also be performed in the same detection area as a function of the situation in order to increase the measurement accuracy by forming an average value, for example.

The predefined values may also be derived from previous measured values. A "teachable" sensor system is thus obtained.

In a refinement of the sensor system according to the present invention, the predefining unit contains a processor which executes instructions of a control program. By using a processor, the sequence of the detection areas, the values of the gain parameters and, if appropriate, also the time for processing a detection area may be determined in a simple and flexible manner. Instead of a predefining unit where detection areas and gain parameter values are hard-wired into the device, although different predefined values may be selected, a predefining unit having a processor by using standardized components and standardized circuits may be constructed.

In another refinement, the predefining unit is connected to the sensor unit and to the amplifier unit via transmission paths for transmitting data words, e.g., via a bus system. The predefining unit transmits data words to the sensor unit and/or the amplifier unit. Then, a detection area is set in the sensor unit as a function of the value of the data word received. As an alternative, the system goes through a sequence of detection areas as a function of the value of the data word received. The value of the gain parameter is determined in a similar manner in the amplifier unit as a function of the value of the data word received. In one embodiment, the value of the data word is used as the value of the gain parameter. In an alternative embodiment, a sequence of values for the gain parameter is selected as a function of the value of the gain parameter and used after a predefined time period. Should the value of the data word be used as the value of the gain parameter, a digital-analog converter may be used, for example, to influence the gain of a current-controlled amplifier.

In another refinement of the sensor system having a processor, an analog/digital converter unit which generates a data word as a function of the signal value of the amplified sensor signal and transmits it to the predefining unit is connected to the output of the amplifier unit. The predefining unit causes a detection result to be output as a function of the data words received during a detection cycle. In this refinement, the processor has a dual function. It is used for predefining the detection areas and/or the gain parameter values, as well as for analyzing the detection cycle(s).

In another embodiment, the predefining unit is connected to a temperature sensor, for example, to a PTC (positive temperature coefficient) element. The predefining unit controls the sensor unit and/or the amplifier unit also as a function of the output signal of the temperature sensor. The effect of temperature on the measurement result may be determined using formulas or measurements. The predefining unit and/or the amplifier unit are triggered so that the effect of the temperature on the measurement result is compensated for. For example, a transmitter element of the sensor unit has its best performance at approximately 40° C. At 80° C. this performance is as much as 10 times less. The value of the gain factor or of a threshold value with which the amplified measurement signal is compared, for example, is changed as a function of the temperature in order to determine whether an object in the current detection area is greater than a certain reference object.

In another embodiment, the predefining unit provides different threshold values during a detection cycle. The threshold values are compared to the amplified sensor signal in a comparator unit. As a function of the comparison result, it is determined whether or not an object is located in the detection area. By generating different threshold values, degrees of freedom are obtained for the determination of the gain parameter values within a detection cycle. For example, the gain parameter value may be held constant when processing consecutive detection areas. However, the value of the threshold value is reduced as required by the above formula (1). It may be simpler to simulate the function represented by formula (1) as an inverse of this function.

In one embodiment, the sensor unit of the sensor system contains at least one transmitter unit for transmitting electromagnetic waves or sound waves, and at least one receiver unit for receiving electromagnetic waves or sound waves which are reflected by the object. Microwaves in the gigahertz range are used as electromagnetic waves. The sound waves preferably have a frequency in the ultrasound range. A sensor unit having such a design operates according to the above-described pulse echo principle in different detection areas.

In one embodiment of the sensor system, the selectable predefined values are the temperature in the surroundings of the sensor system and/or the chronological sequence of the processing of detection areas and/or the selection of detection areas.

In another embodiment, the value of the gain factor is maintained unchanged for a plurality of consecutive detection areas. In this case, threshold values are modified from one detection area to another. The operation of the amplifier is more stable if the gain factor is not constantly modified.

The present invention furthermore relates to a method, in particular for determining distances, which is carried out using the functions of the sensor system according to the present invention. In further refinements of the method, steps implementing the functions of the refinements of the sensor system are also carried out. The aforementioned technical effects thus also apply to the method according to the present invention and its refinements.

The sensor system according to a second aspect contains a sensor unit, an amplifier unit, a gain predefining unit, a threshold value predefining unit, and a comparator unit. The threshold value predefining unit is used for generating a threshold value. The threshold value is compared with the amplified sensor output signal in the comparator unit. A signal, whose value indicates whether an object is located in a detection area, is generated as a function of the comparison result.

The present invention is based on the principle that degrees of freedom are obtained for predefining the values of the gain parameter if different threshold values, rather than one constant threshold value, are used within a detection cycle.

In one embodiment of the sensor system according to a second aspect of the present invention, this principle is made use of, and the same values of the gain factor are predefined by the predefining unit when processing a plurality of consecutive detection areas. Predefining the values of the gain factor may be simplified in this way because the gain factor does not have to be changed until the consecutive detection areas have been processed. On the other hand, however, the threshold values are modifiable according to a function which differs from a function that modifies the values of the gain parameter at a constant threshold value. The function for predefining the threshold values may be easier to determine than the function for predefining the values of the gain parameter. The function is very similar to the one given by equation (1) and is determinable via simple measurements. Furthermore, the amplifier operates in a more stable manner if the value of the gain factor is changed less frequently.

In one embodiment, the gain and threshold value predefining unit are implemented in one unit which contains a processor.

When using a processor in the sensor system, in one embodiment data words are transmitted between the gain predefining and threshold value predefining units and the sensor unit, as well as the amplifier unit, for example, via a bus system.

In another embodiment, the processor is also used for analyzing the detection. This dual function justifies the cost of using a processor.

In addition, the present invention relates to a method during whose execution the functions of the sensor system are implemented using different threshold values. The functions of the refinements of the sensor system are also implemented, using different threshold values, in embodiments of this method. The above-mentioned technical effects thus also apply to the method.

The present invention also relates to computer programs, using which the methods according to the present invention are implementable. Furthermore, it relates to data storage media for storing these computer programs, for example, CDs (compact discs) or memory circuits.

BRIEF DESCRIPTION OF THE DRAWINGS

FIG. 3 shows a gain curve, a measuring curve, and a measuring curve obtained when using the gain curve.

FIG. 4 shows a measuring curve obtained when using the gain curve and a threshold value curve derived therefrom.

DETAILED DESCRIPTION

In the figures, the same reference symbols denote the same elements or elements having the same function.

Figure 1:
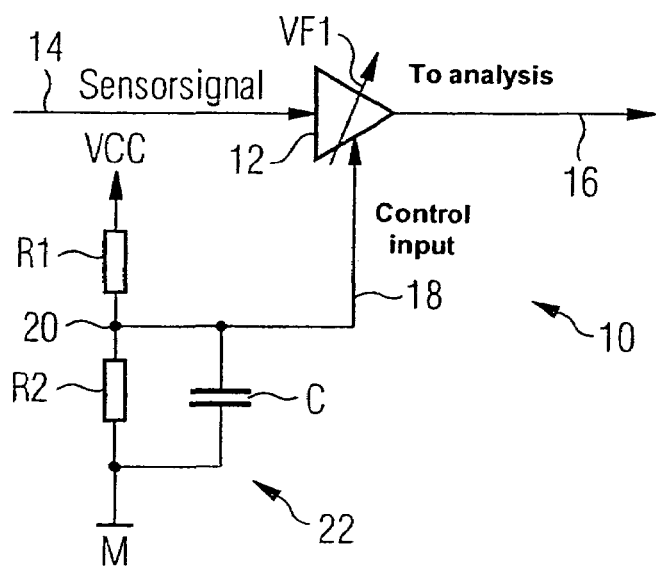
FIG. 1 shows a schematic diagram of a known circuit for predefining values of a gain factor.
Figure 2:
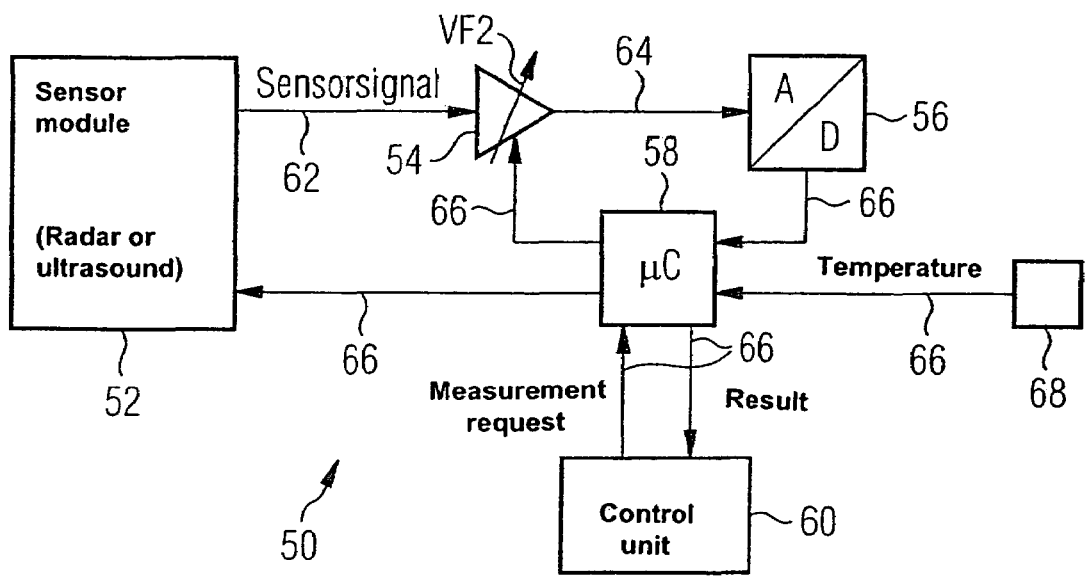
FIG. 2 shows a sensor system for distance determination.

FIG. 2 shows a sensor system 50, which contains a sensor module 52, an amplifier 54, an analog/digital converter 56, a processor 58 (μC microcontroller), and a control unit 60. The sensor module operates according to the known pulse echo principle explained above. The design of the sensor module does not need to be described in detail, since the function of its components is known; for example, the function of a dielectric radar oscillator, the function of radar transmitting and radar receiving antennas, and the function of a mixer contained in the radar unit. Such sensor modules 52 are manufactured and sold by the K6-AS company (formerly Motometer). The units operating at lower frequencies, however, are illustrated in FIG. 2.

A line 62 connects the output of sensor module 52 to the input of amplifier 54. The sensor signal is transmitted over line 62. Amplifier 54 is of the type CA3080, for example. From the sensor signal received at the input, an amplified sensor signal is generated at the output of amplifier 54 as a function of the value of a gain factor VF2 and transmitted to A/D converter 56 via an output line 64. Converter 56 converts the analog signal received at its output into a digital data word which is transmitted to processor 58 via a bus 66 a plurality of parallel data lines. Processor 58 executes a control program whose instructions are stored in a memory unit (not illustrated) of sensor system 50. Processor 58 predefines data words, whose values denote the current measuring area, for sensor module 52 via bus system 66. Processor 58 predefines data words, whose values determine the value of gain factor VF2, for amplifier 54 via bus system 66. Digital/analog converter units (not illustrated) are located between bus system 66 and sensor module 52, and between bus system 66 and the control input of amplifier 54.

Sensor system 50 also contains a temperature sensor 68, which generates a digital output signal as a function of the temperature at which sensor system 50 is operating. The temperature is transmitted, using a data word, from temperature sensor 68 to processor 58 via data bus 66.

Control unit 60 contains, for example, a keyboard and a display unit. Bus system 66 is also used for connecting control unit 60 to processor 58.

The function of sensor unit 50, in particular in predefining the detection areas and gain factor VF2 via processor 58, is elucidated with reference to FIGS. 3 and 4. The function of processor 58 in taking into account the temperature detected by temperature sensor 68 is explained in connection with FIGS. 3 and 4.

FIG. 3 shows a stepped gain curve 100, a measuring curve 102, and a measuring curve 104, which is obtained via amplification of the signal values of measuring curve 102 by the particular gain factors determined by gain curve 100.

The measured distance in centimeters is plotted on an x axis 106. A detection cycle detects in this embodiment a measuring range of 25 cm to 2 m. The measuring range is subdivided into measuring cells spaced 3 cm apart.

A y axis 108 is used for representing the values of gain factor VF2. The gain factor is varied in a range of 1 to 6.25 within a detection cycle. y axis 108 is used in connection with gain curve 100. Another y axis 110 is used for representing the amplitude values of the measuring signals that belong to measuring curves 102 and 104. The voltage values of these signals are between 0 volts and 2.5 volts.

The individual measuring cells are processed by processor 58 in approximately 50 μs each. During this time the sensor module generates approximately 300 radar pulses which, if an object is located in the particular measuring cell, are received again as reflected radar pulses and added up. The added up signal is transmitted via line 62. Processor 58 transmits to sensor module 52 a data word denoting the measuring cell starting at 25 cm. After 50 μs, processor 58 transmits a data word denoting the next measuring cell, i.e., the one starting at 28 cm, and so forth.

A maximum object, for example, a steel wall having the dimensions of the back of a truck having a frame for containers, is measured to determine the gain factors. The normal to the steel wall points to sensor module 52 during the measurement. The steel wall is placed consecutively into the different measuring cells, starting with the measuring cell at 25 cm up to the measuring cell at 2 m. The radar pulses reflected by the steel wall are added up for a period of 50 μs and provide sensor signals which are represented by measuring curve 102. For a distance of 25 cm between steel wall and sensor module, a signal having an amplitude of approximately 2.5 volts is obtained (see measuring point 112). For a distance of 100 cm, the amplitude is only approximately 1 volt (see measuring point 114). Measuring curve 102 may be described using formula (1).

Amplifying the sensor signal with different gain factors VF2 allows an analog/digital converter 56 having a smaller bit length to be used (see gain curve 100). In the measuring area between 25 cm and 50 cm, gain factor VF2 has the value 1. In the area between 50 cm and 75 cm, gain factor VF2 has the 2.5-fold value, i.e., the value 2.5. In the area between 100 cm and 200 cm, a gain factor increased again by the factor 2.5 and having the value 6.25 is used. The values of gain factor VF2 are determined in such a way that the amplified sensor signal represented by curve 104 has amplitude values between 1 volt and 2.5 volts. This means that the value of gain factor VF2 is increased when the value of the amplified sensor signal drops below 1 volt. Measuring curve 104 thus obtained has a saw tooth shape, where the limits of the individual "teeth" are predefined by the measuring distances at which the value of gain factor VF2 is modified, here at 50 cm and 100 cm. These values are stored in a memory. The values of gain factor VF2 are transmitted by processor 58 to amplifier 54. At a certain point in time, processor 58 transmits the data word, which denotes the measuring cell located at 50 cm, to the sensor module. Immediately thereafter, a data word containing the value 2.5, for example, is sent to amplifier 54. This value is used as the new value of gain factor VF2. Another data word is transmitted by processor 58 to amplifier 54 when a data word for denoting the measuring cell that begins at 100 cm was transmitted to the sensor module immediately before.

FIG. 4 shows a measuring curve 104a, which is an enlarged representation of measuring curve 104. An x axis 106a denotes the distances of measuring cells from sensor module 52 in centimeters. Essentially, x axis 106a corresponds to x axis 106. A y axis 110a is an enlarged representation of y axis 100. A threshold value curve 116, which determines a threshold value for each measuring cell, is obtained by multiplying the amplitude values of measuring curve 104a by the factor 0.25. The amplitude values of the threshold values of threshold value curve 116 are 25% of the amplitude values of measuring curve 104 for the same measuring cells. Threshold value curve 104 is stored in the memory unit of the sensor system. The data words coming from converter 56 are compared with the data words containing the amplitude values of threshold value curve 116. If the value of the data word coming from converter 56 is greater than the threshold value, this means that an object is located in the currently processed measuring cell. Objects that are considerably smaller than the maximum object are also detected. However, if the value of the data word coming from converter 56 is less than the amplitude value of threshold value curve 108 in the current measuring area, no object is detected in the measuring cell, since it is assumed that the reflected signal is caused by very small objects such as grass or road debris.

The temperature has a considerable effect on the performance of the radar oscillator in the sensor module. For example, the radar oscillator has its highest performance at 40° C. and a performance reduced ten-fold at 80° C. The control program for processor 58 is programmed in such a way that the values of gain factor VF2 are selected as a function of the temperature in the first exemplary embodiment. With higher temperatures, larger values are used for gain factor VF2 so that the same amplitude values are obtained for the same objects despite the reduced performance of the radar oscillator at higher temperatures. Threshold value curve 116 is independent of the temperature.

In contrast, in a second exemplary embodiment, threshold value curve 108 is predefined as a function of the temperature. The values of the gain factor remain unaffected by the temperature and follow a curve, for example, shown in FIG. 3. As the temperature increases, the factor for determining threshold value curve 108 from measured value curve 104a decreases in order to compensate for the effect of the temperature on the performance of the radar oscillator.

In a third exemplary embodiment, both the values of the gain factor and the threshold values are varied as a function of the temperature.

In a fourth exemplary embodiment, the measuring range may be changed using control unit 60. For example, instead of the measuring area from 25 cm to 200 cm, a measuring area from 0 cm to 7 m is processed. The processor transmits different data words to sensor module 52 and amplifier 54 as a function of the particular measuring request.

Although the present invention has been described above with reference to preferred exemplary embodiments, it is not limited thereto, but is modifiable in a plurality of ways.

What is claimed is:

1. A sensor system for determining a distance, comprising:
    a sensor unit that operates in different detection areas during a detection cycle and generates, as a function of at least one of the detection areas, at least one sensor signal, a value of the at least one sensor signal being affected by an object located in the at least one of the detection areas;
    a controllable amplifier unit for amplifying the at least one sensor signal to produce an amplified sensor signal as a function of a value of a gain parameter; and
    a gain predefining unit for predefining different values for the gain parameter during the detection cycle, wherein:
        the gain predefining unit sets a constant gain parameter for the at least one of the detection areas as a function of the at least one of the detection areas to be examined,
        the gain predefining unit predefines different threshold values during the detection cycle, the different threshold values being different for a plurality of consecutive detection areas, and
        as a function of a result of a comparison of the amplified sensor signal to the different threshold values, whether the object located in the at least one of the detection areas is of a certain size is determined.

2. The sensor system as recited in claim 1, wherein:
    the gain predefining unit includes a processor that executes instructions of a control program.

3. The sensor system as recited in claim 2, further comprising:
    transmission paths via which the gain predefining unit is connected to the sensor unit and the controllable amplifier unit, the transmission paths transmitting a data word having a predefined number of bit positions, wherein:
        the gain predefining unit transmits the data word to at least one of the sensor unit and the controllable amplifier unit, and
        at least one of the following occurs:
            the sensor unit sets the different detection areas as a function of the data word that has been received, and
            the controllable amplifier unit sets at least one of the different values of the gain parameter as a function of the data word that is received.

4. The sensor system as recited in claim 2, further comprising:
    an analog/digital converter unit connected to an output of the controllable amplifier unit and for generating the data word as a function of a signal value at an input thereof, the analog/digital converter unit transmitting the data word to the gain predefining unit, wherein:
        the gain predefining unit causes a detection result to be output as a function of the data word received during the detection cycle.

5. The sensor system as recited in claim 1, further comprising:
    a temperature sensor connected to the gain predefining unit, wherein:
        an output signal of the temperature sensor depends on a temperature at which the sensor system operates,
        the gain predefining unit controls at least one of the sensor unit and the controllable amplifier unit as a function of the output signal of the temperature sensor.

6. The sensor system as recited in claim 1, wherein:
    the sensor unit includes:
        at least one transmitter unit for transmitting one of an electromagnetic wave and a sound wave, and
        at least one receiver unit for receiving the one of the electromagnetic wave and the sound wave reflected by the object.

7. A method of determining a distance, comprising:
    causing a sensor unit to operate in different detection areas during a detection cycle;
    causing the sensor unit to generate at least one sensor signal, a value of the at least one sensor signal being affected by an object located in at least one of the detection areas;

amplifying the at least one sensor signal as a function of a gain parameter to produce an amplified sensor signal;

predefining different values of the gain parameter during the detection cycle;

setting a constant gain factor for the at least one of the detection areas as a function of the at least one of the detection areas to be examined, a threshold value being used for the at least one of the detection areas;

performing a comparison of the amplified sensor signal with the threshold value; and as a function of the comparison, determining whether the object located in the at least one of the detection areas is of a certain size.

* * * * *